(No Model.) 2 Sheets—Sheet 1.

J. APPLETON.
VEHICLE.

No. 569,779. Patented Oct. 20, 1896.

Witnesses
Mobry Haynes.
L. B. Hodge.

Inventor
John Appleton
By Joshua B. Webster
Attorney (No Model.) 2 Sheets—Sheet 2.
J. APPLETON.
VEHICLE.
No. 569,779. Patented Oct. 20, 1896.
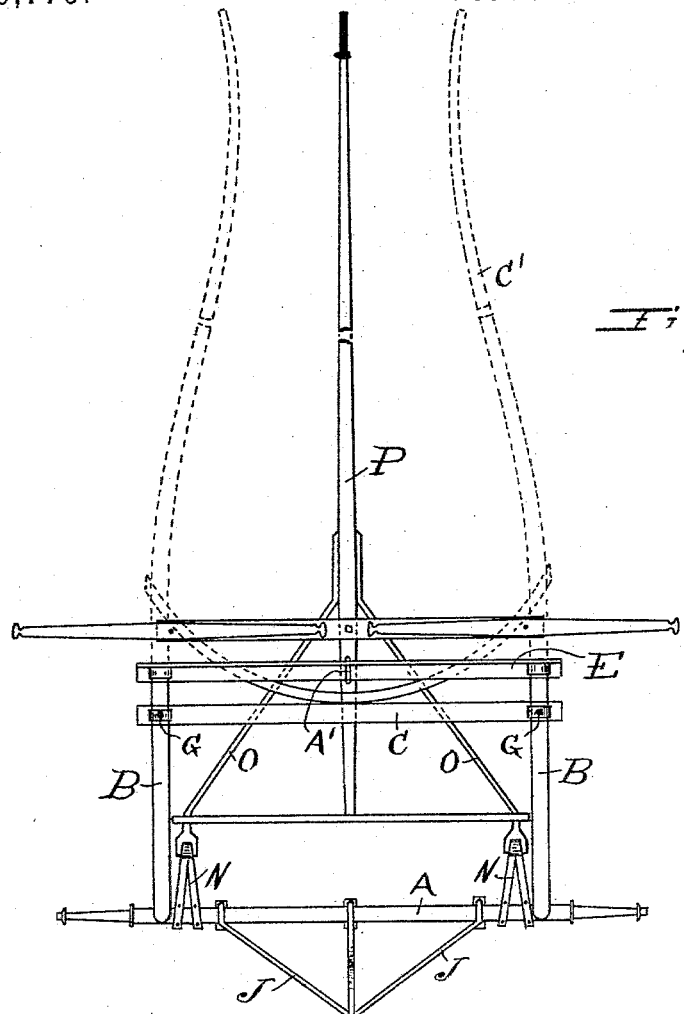
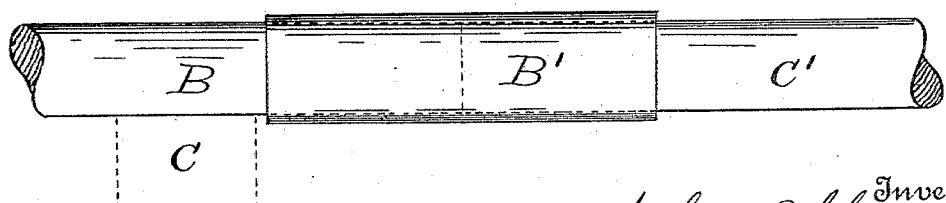
Witnesses
Molbry Haynes.
L. B. Hodge.
Inventor
John Appleton
By Joshua B. Webster
Attorney

UNITED STATES PATENT OFFICE.

JOHN APPLETON, OF MIDDLETOWN, CALIFORNIA.

VEHICLE.

SPECIFICATION forming part of Letters Patent No. 569,779, dated October 20, 1896.

Application filed February 11, 1896. Serial No. 578,965. (No model.)

*To all whom it may concern:*

Be it known that I, JOHN APPLETON, a citizen of the United States, residing at Middletown, in the county of Lake and State of California, have invented certain new and useful Improvements in Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in vehicles such as are designed for traveling purposes.

The object of my invention is to provide a two-wheeled vehicle which may be expeditiously converted to the use of one or two horses, as is desired, also to provide a top and side curtain; and it consists in the peculiar construction and novel combination and adaptation of parts hereinafter described, and particularly pointed out in the claims hereunto annexed.

Figure 1:
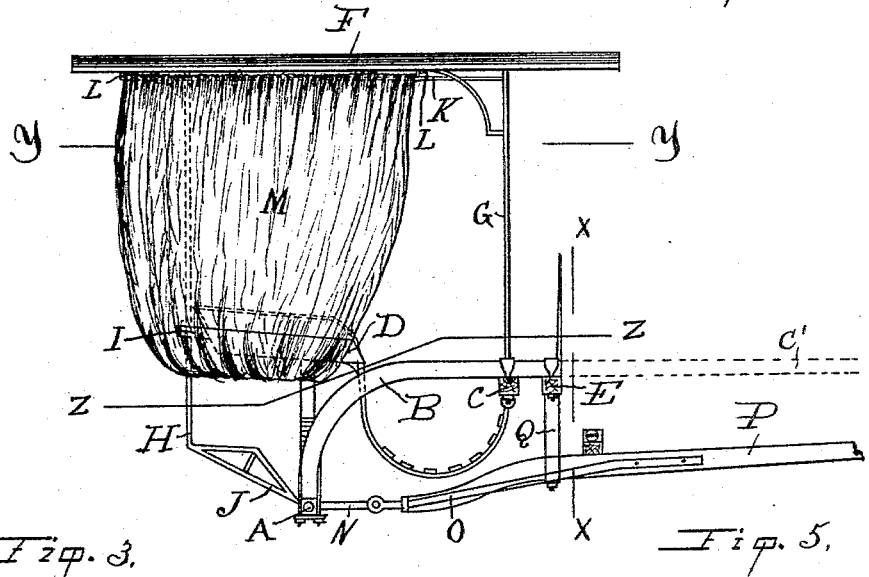
Figures 3, 5:
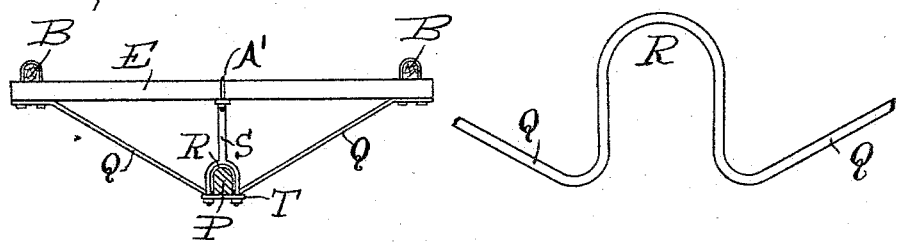
Figure 4:
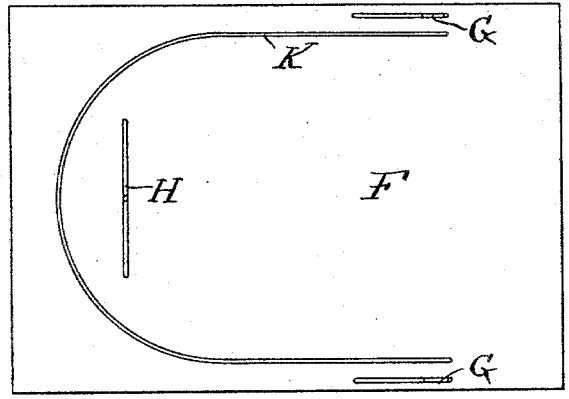

Referring to the accompanying drawings, Figure 1 is a right-hand side elevation of my improved vehicle. Fig. 2 is a horizontal sectional view of the same through line Z Z, Fig. 1. Fig. 3 is a sectional view through line X X, Fig. 1. Fig. 4 is a sectional view of the top through line Y Y, Fig. 1. Fig. 5 is a detached enlarged view of the tongue-supporting bar. Fig. 6 is a detached enlarged view of the connecting-thimble for attaching the shafts.

Similar letters of reference indicate corresponding parts throughout the entire views.

A represents the axle; B, the rear ends of the shafts; C, the front cross-bar, and D the seat and body of a cart of ordinary type. The shafts B are cut off immediately in front of the cross-bar C.

F represents a top, which is of ordinary construction and is supported in front by means of two vertical bars G, which are attached to the cross-bar C at their lower end, and the rear of the top is supported by means of a single bar H, which is rigidly attached to the center of the axle A. Such bar is angled so as to pass upwardly to the rear of the seat D, which is provided with a slotted lug I, which is adapted to engage the bar H for the purpose of maintaining such bar in a vertical position. To render the bar H more rigid and stiff, the same is provided with brace-rods J, which are attached at their outer ends to the axle A.

The top F is provided with a curtain-rod K, which is arranged in a semicircular form and rigidly attached to the under side thereof by means of short lugs L at either end and the center of the semicircle. A curtain M is adapted to engage at the top with the curtain-rod K, and the bottom of such curtain M is rigidly attached to the under side of the seat in any desired manner.

Draft-irons N are rigidly attached to the axle A near either end. Such draft-irons N are V-shaped for the purpose of preventing the same from becoming loose by means of the side draft or motion. The forward ends of the draft-irons N are each provided with an eye, which are adapted to engage with pole-braces O, which are formed into eyebolts at their rear ends and engage with the pole P in the usual manner.

The body D is attached and maintained in rigid position with relation to the pole P by means of a double brace Q, which is rigidly attached at its ends to and near the ends of the cross-bar E, and which brace Q is provided with an inverted-U-shaped curve R, into which the pole P is adapted to be inserted. An inverted-Y-shaped clip S is inserted over the curve R and is attached beneath the pole P by means of a bar T, usually employed on clips. The upper end of the clip S is rigidly attached to the center of the bar E by means of a clip A'.

B' represents a ferrule which is adapted to be inserted on the end of each of the shafts C', when they are attached for use instead of the pole P.

The mode of operating my improved vehicle is as follows: When it is desired to remove the pole P and substitute the shafts C', the cross-bar E is removed from the shafts and the braces O are detached from the draft-iron N, whereupon the pole may be removed and stored. The shafts are then placed in position and the ferrule B' is inserted over the ends of the same and rigidly attached thereto. The curtain M may be pressed rearwardly and attached in that position, thus rendering the access to the vehicle unobstructed. When the rider is seated in the vehicle, the curtain M may be adjusted on either side, thus excluding all dust and rain.

I am aware that vehicles of the class described have been made with tops, and that feature I do not claim, broadly; but What I do claim as new, and desire to secure by Letters Patent, is—

1. In a vehicle of the class described the combination with suitable wheels, axle, and body of the shafts B rigidly attached to the axle and cut off immediately in front of the body, the draft-irons N rigidly attached to and near the ends of the axle, the pole O P suitably attached to such draft-irons N, the cross-bar E rigidly attached to the front end of the shafts B, the double brace Q rigidly attached to the cross-bar E, and provided with the inverted-U-shaped curve R, such curve R being adapted to engage with the pole P, and the clip S adapted to embrace the pole P, and the cross-bar E, all arranged substantially as shown and described.

2. In a vehicle of the class described, the combination of the axle, the body mounted on springs arranged on and connected with the axle and having the rear guide-lug I, the shafts B, rigidly attached to the axle and connected to the forward cross-bar of the body, the bars G, connected to and extending upwardly from the shafts B, the bar H, extending up through the guide-lug I, on the body and rigidly connected at its lower end to the axle A, the top secured upon the bars G, and H, the curtain-rod connected with the top, and the curtain suspended from the curtain-rod, substantially as and for the purpose set forth.

In testimony whereof I affix my signature in presence of two witnesses.

JOHN APPLETON.

Witnesses:
  MOLBRY HAYNES,
  JOSHUA B. WEBSTER.